INVENTORS
ALDEN W. HANSON
ALLEN L. HESTON
HANS E. BUECKEN
BY
ATTORNEY

Aug. 22, 1950

A. W. HANSON ET AL 2,519,834

MEANS FOR MILLING, MIXING, AND
EXTRUDING PLASTIC MATERIAL

Filed March 11, 1947

INVENTORS
ALDEN W. HANSON
ALLEN L. HESTON
HANS E. BUECKEN
BY
ATTORNEY

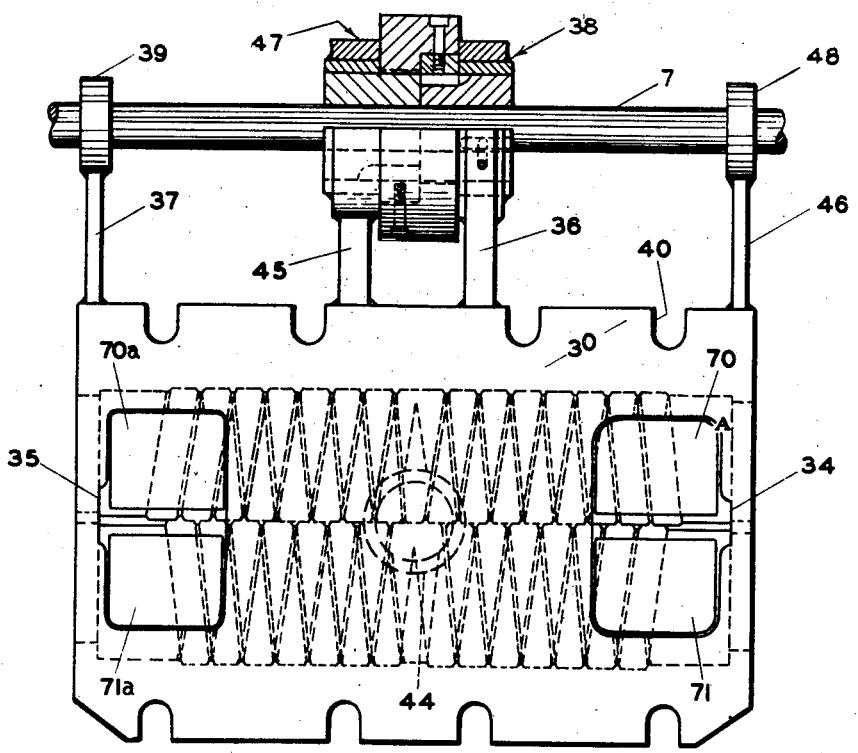
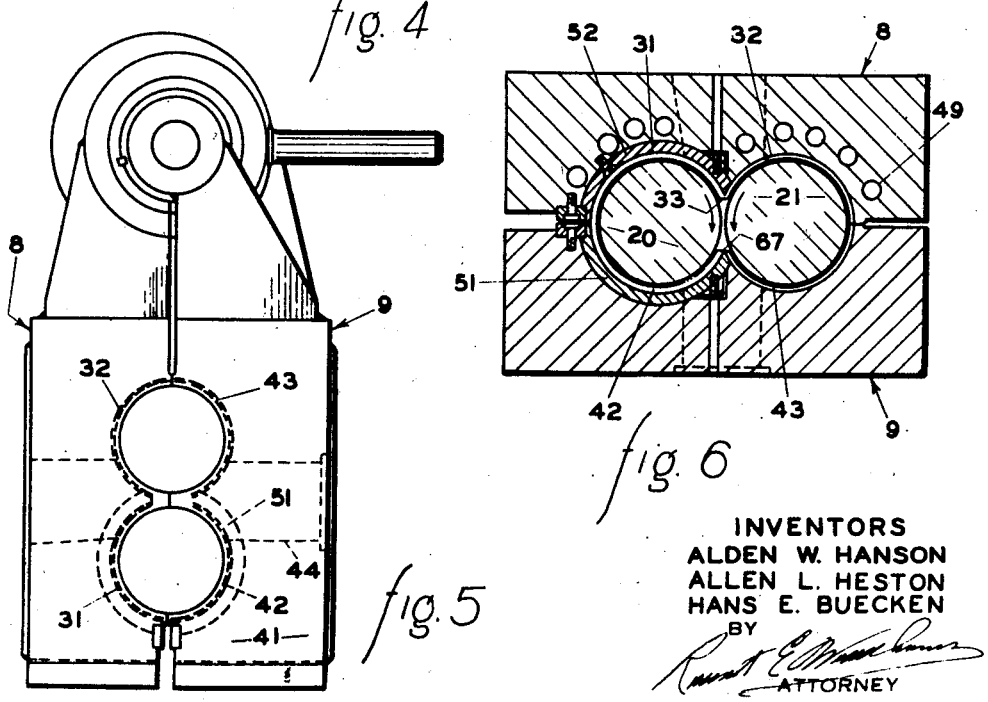

Aug. 22, 1950 A. W. HANSON ET AL 2,519,834
MEANS FOR MILLING, MIXING, AND
EXTRUDING PLASTIC MATERIAL
Filed March 11, 1947 9 Sheets-Sheet 5

INVENTORS
ALDEN W. HANSON
ALLEN L. HESTON
HANS E. BUECKEN
BY
ATTORNEY

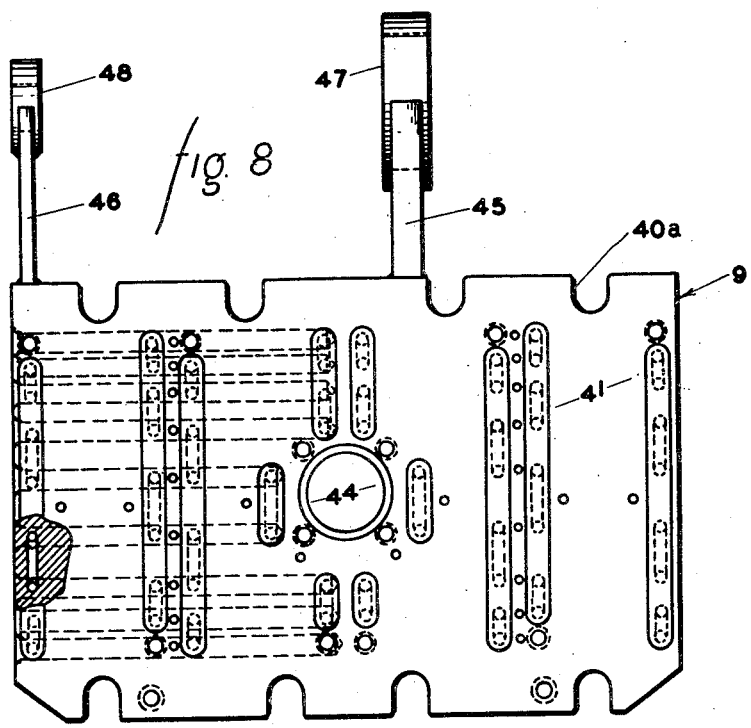
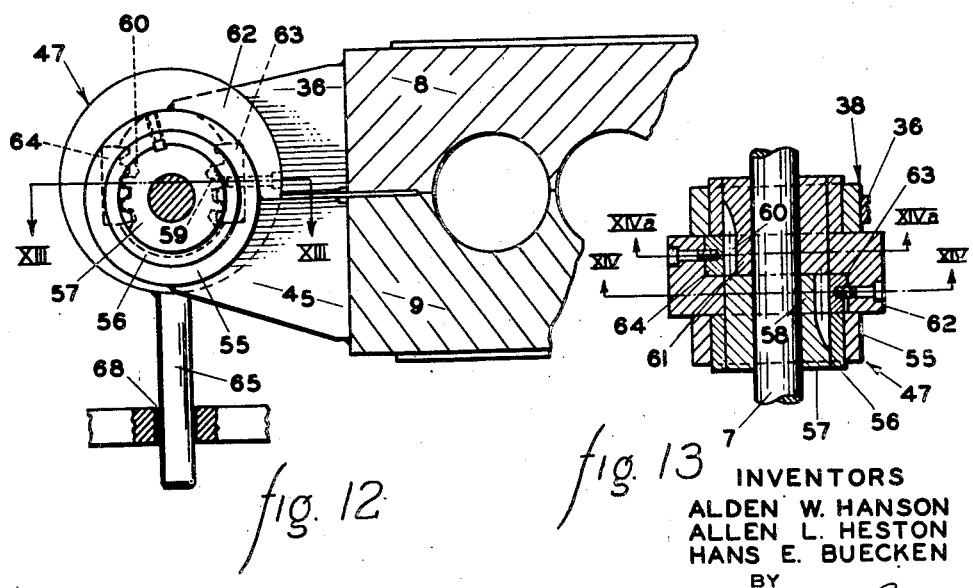

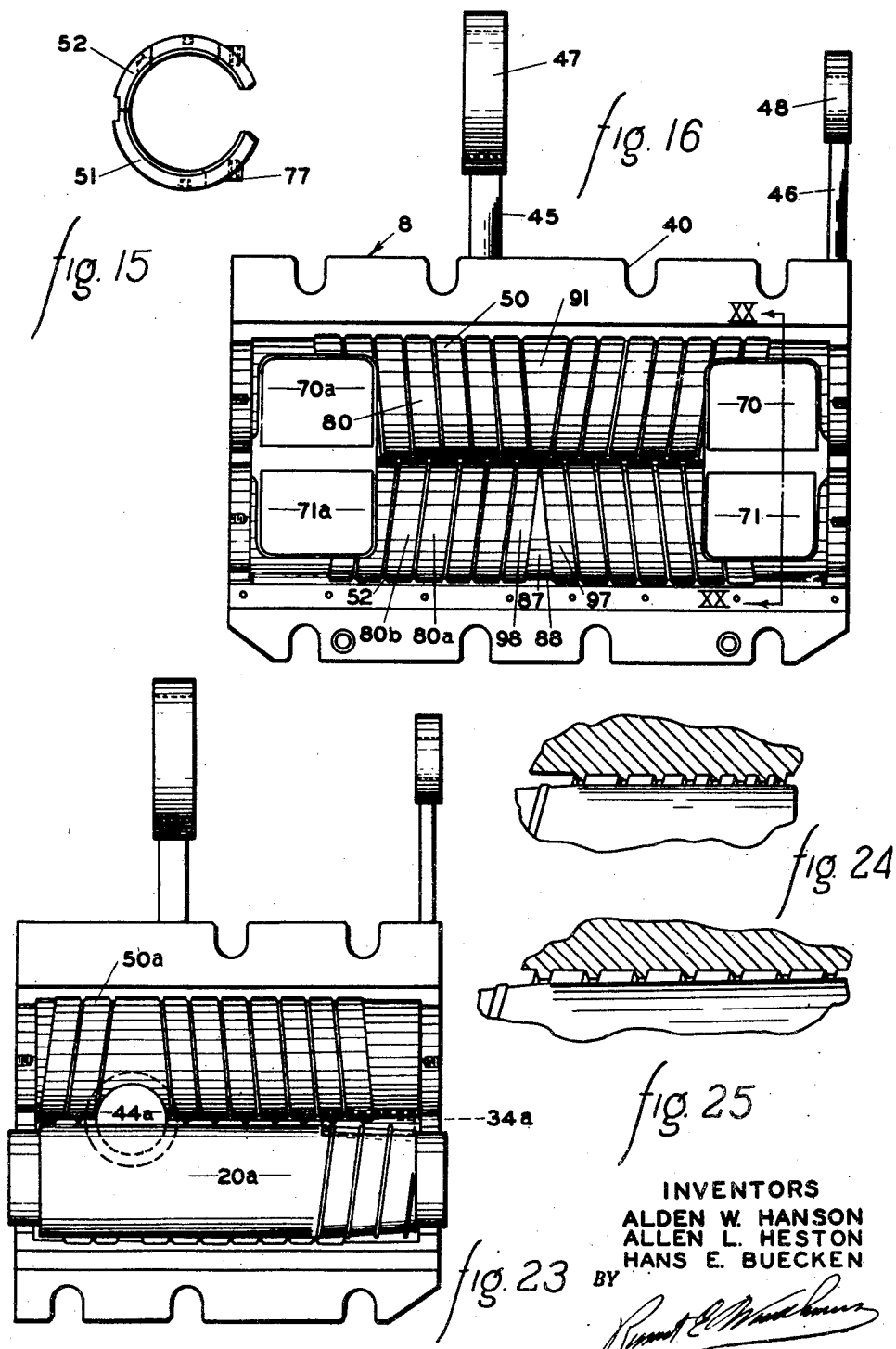

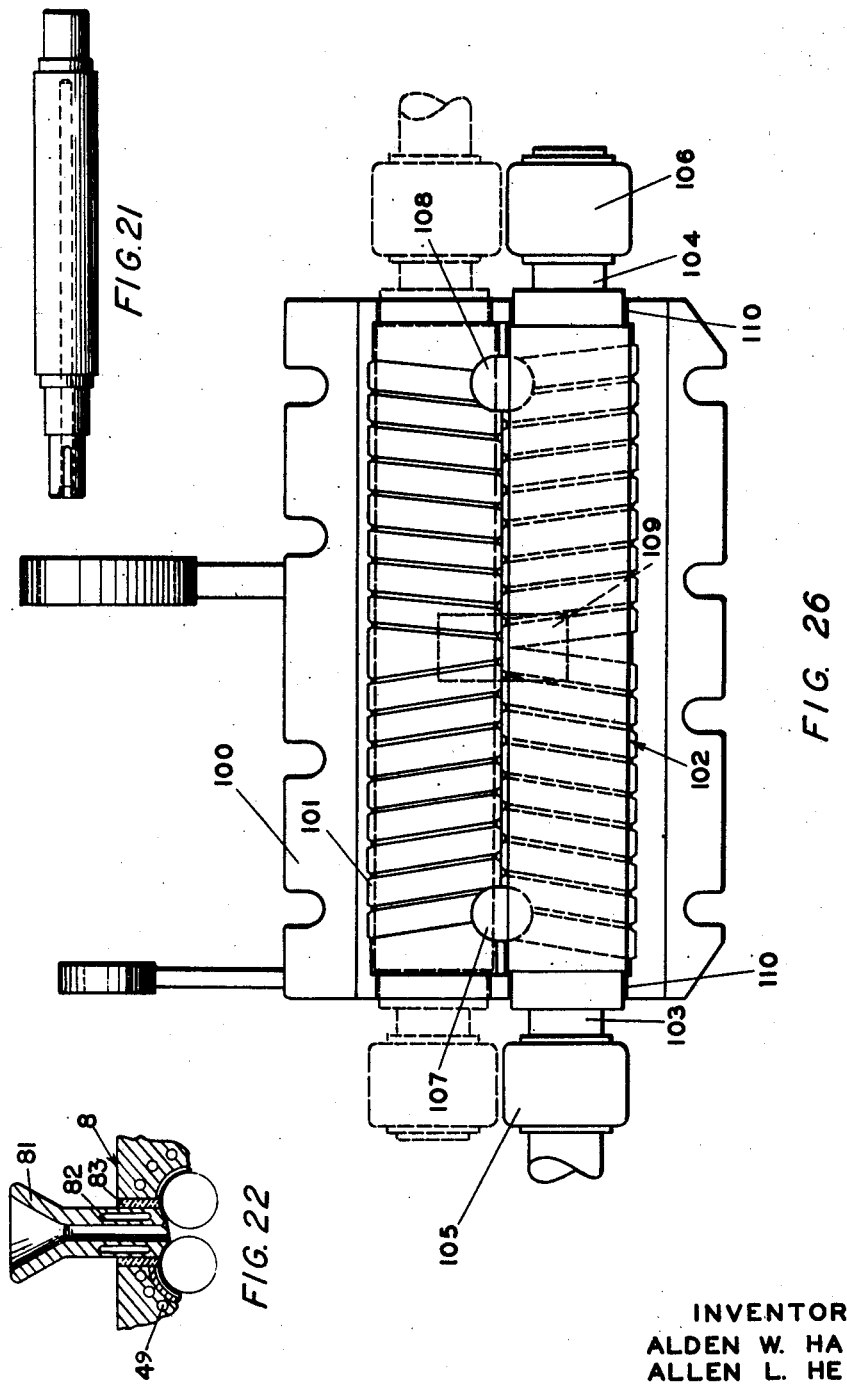

Patented Aug. 22, 1950

2,519,834

UNITED STATES PATENT OFFICE 2,519,834

MEANS FOR MILLING, MIXING, AND EXTRUDING PLASTIC MATERIAL

Alden W. Hanson, Midland, Mich., and Allen L. Heston and Hans E. Buecken, Akron, Ohio; said Hanson assignor to The Dow Chemical Company, Midland, Mich., a corporation of Delaware; said Heston and said Buecken assignors to National Rubber Machinery Company, Akron, Ohio, a corporation of Ohio Application March 11, 1947, Serial No. 733,890

16 Claims. (Cl. 18—2)

This invention refers to a machine for processing and extruding a plastic material. Such "processing" includes any part or all of the particular steps of milling, mixing, colloiding, heating or cooling, as well as other steps of related types.

The milling, mixing, and other processing, and extruding of plastic material by conventional equipment requires the presence of at least two and sometimes three kinds of machines, namely, a mill and an extruder and sometimes a separate mixer. Further, since such a mill and such a mixer both operate by batch process, at least two, and often three or more, of each of said machines are required to supply suitably processed material to one extruder. Thus a great deal of equipment and floor space are required to keep a continuous flow of material going through a single extrusion die.

These machines are expensive to make and to use. The extruder screw alone is a highly expensive item. The batch process by which they necessarily operate requires a great deal of handling of material, as it is transferred from one piece of equipment to another, with attendant expense. Thus it is highly desirable to provide a single machine which will effect all of the operations involved in processing and extruding of a plastic material and, further, which will do so as a continuous operation.

Recently, there has been made available a machine known commercially as a "Plastruder" disclosed and described by Alden W. Hanson, one of the inventors herein, in U. S. Patent No. 2,488,189, wherein the functions of milling, mixing and creating of pressure for extrusion are all accomplished by a relatively simple machine, involving as its primary element a pair of smooth rolls having their adjacent surfaces longitudinally parallel to each other and each enclosed by closely adjacent walls having wide helical grooves therein. This machine and the principles embodied therein have made possible an entirely different type of milling, mixing and extruding equipment over those previously known.

In this machine, however, there are still certain drawbacks in its specific design which it is the purpose of the hereinafter disclosed and described invention to correct. It is desirable to provide a machine utilizing certain of the principles of the said "Plastruder" but which will be more practical to manufacture, sturdier in operation and more convenient and efficient in use.

Accordingly, a major object of the invention is to provide a machine for milling, mixing, colloiding, heating, cooling, or otherwise processing, and extruding plastic material and ingredients associated therewith, which will utilize the major principles of the above mentioned "Plastruder" but which will be more durable, effective and versatile than said machine and hence capable of more rigorous use and a wider variety of use.

A further object of the invention is to provide a machine as aforesaid which will be convenient and efficient to use.

A further object of the invention is to provide a machine as aforesaid in which the operating parts may be readily and quickly changed as desired for maintenance purposes or for the securing of different operating characteristics.

A further object of the invention is to provide a machine as aforesaid having a high output capacity and yet requiring relatively limited floor space.

Other objects and purposes of the invention will be apparent to those persons acquainted with equipment of this type upon examination of the accompanying drawings and reading of the following disclosure.

In the drawings:

Figure 4 is a top phantom view of the roll containing housing, with said rolls removed.

Figure 5 is an end view of the parts shown in Figure 4 taken from the righthand end thereof as same appears in the drawing.

Figure 6 is a section taken on the line VI—VI of Figure 1.

Figure 8 is a bottom plan view of the lower roll receiving housing.

Figure 12 is an illustration of the hinge mechanism supporting the housing and taken on the line XII—XII of Figure 2.

Figure 13 is a section taken on the line XIII—XIII of Figure 12.

Figure 15 is an end view of the eccentric liner halves assembled in operative position.

Figure 16 is a bottom plan view of the upper roll receiving housing with the feed slot controlling blocks in position in both feeding openings.

Figure 21 is an alternative form of roller shown separated from the rest of the construction.

Figure 22 is an alternate form of construction in the region of the feeding opening.

Figure 23 illustrates a modification of the general combination.

Figure 24 illustrates a modification of the groove construction by a fragmentary view similar to Figure 11.

Figure 25 illustrates a further modification of the groove construction by a fragmentary view similar to Figure 11.

Figure 26 illustrates a further modification of the general combination.

General description

The machine herein illustrated and described comprises a pair of housings, or platens, hinged to each other for easy opening and closing with respect to each other, each housing having recesses therein cooperating with corresponding recesses in the other housing to define a pair of substantially cylindrical, adjacent, communicating, processing chambers having their axes in a common plane. These chambers have grooves helically around the walls of at least one of them leading from near each end thereof toward a discharge point located intermediate the ends thereof, which in the embodiment here specifically illustrated is substantially equi-distant between said ends but which may be varied toward one end or the other end as hereinafter described. Each of said processing chambers has a rotatable, and at least partially smooth, processing roll contained within it, which rolls are adjacent each other sufficiently closely to provide for milling of plastic material passing between them. In the embodiment selected for primary illustration, material is fed to said processing rolls at one or both of their respective ends, is carried between them and milled thereby and is concurrently carried along and around the rolls following said helical grooves by which thoroughly to mix and masticate the material. Material is thus carried from the feeding point or points of the pair of rolls toward said discharge point and is there discharged under a considerable pressure to whatever means is provided for receiving such material, such as an extrusion die.

Frame and organization

Figure 1:
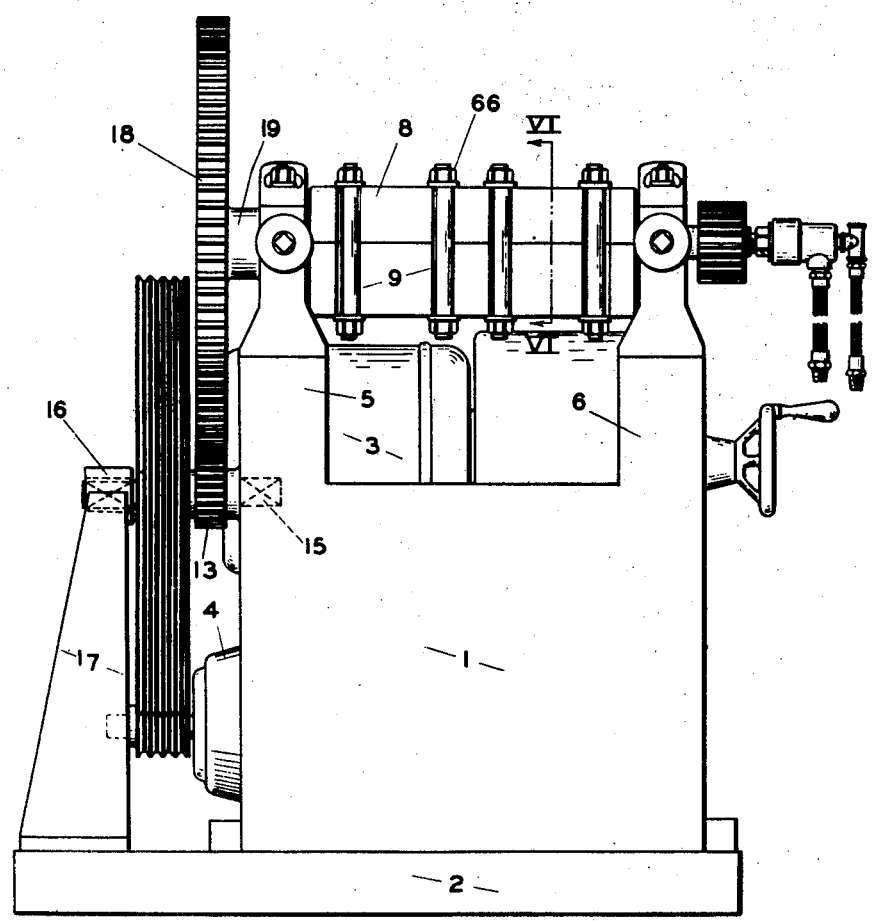
Figure 1 is a side assembly view of my machine.
Figure 2:
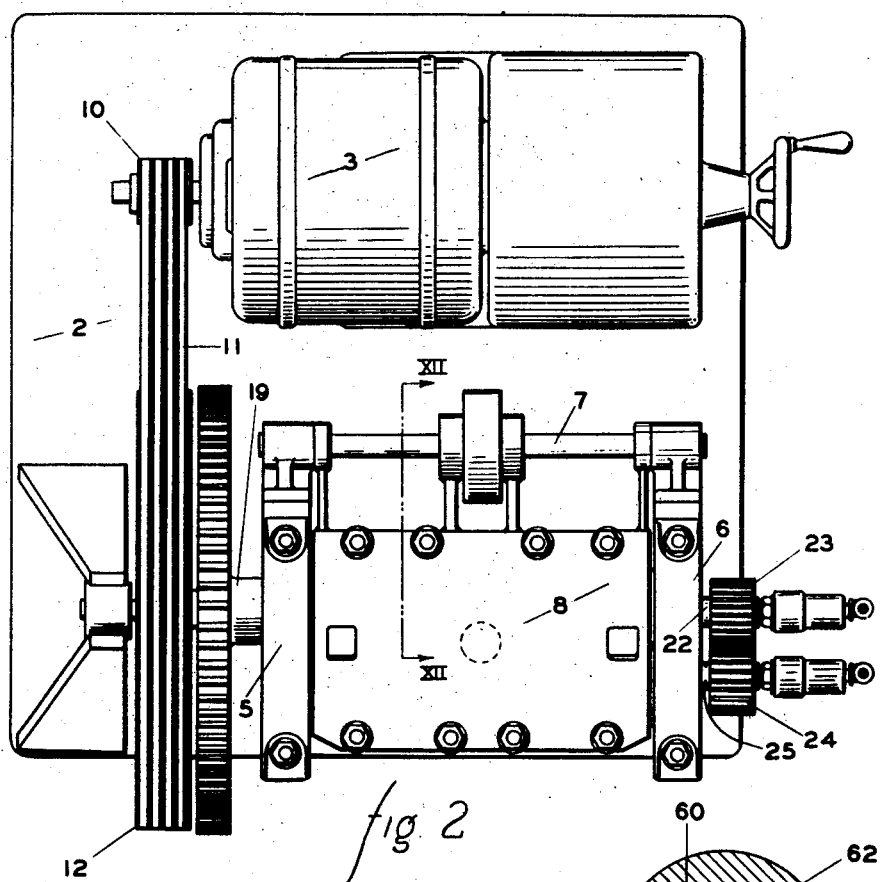
Figure 2 is a top assembly view of my machine.
Figure 14:
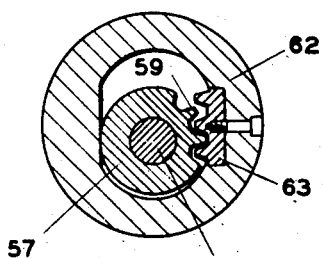
Figure 14 is a section taken on the line XIV—XIV of Figure 13.
Figure 14A:
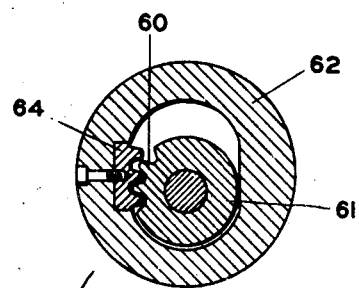
Figure 14a is a section taken on the line XIVa—XIVa of Figure 13.
Figure 3:
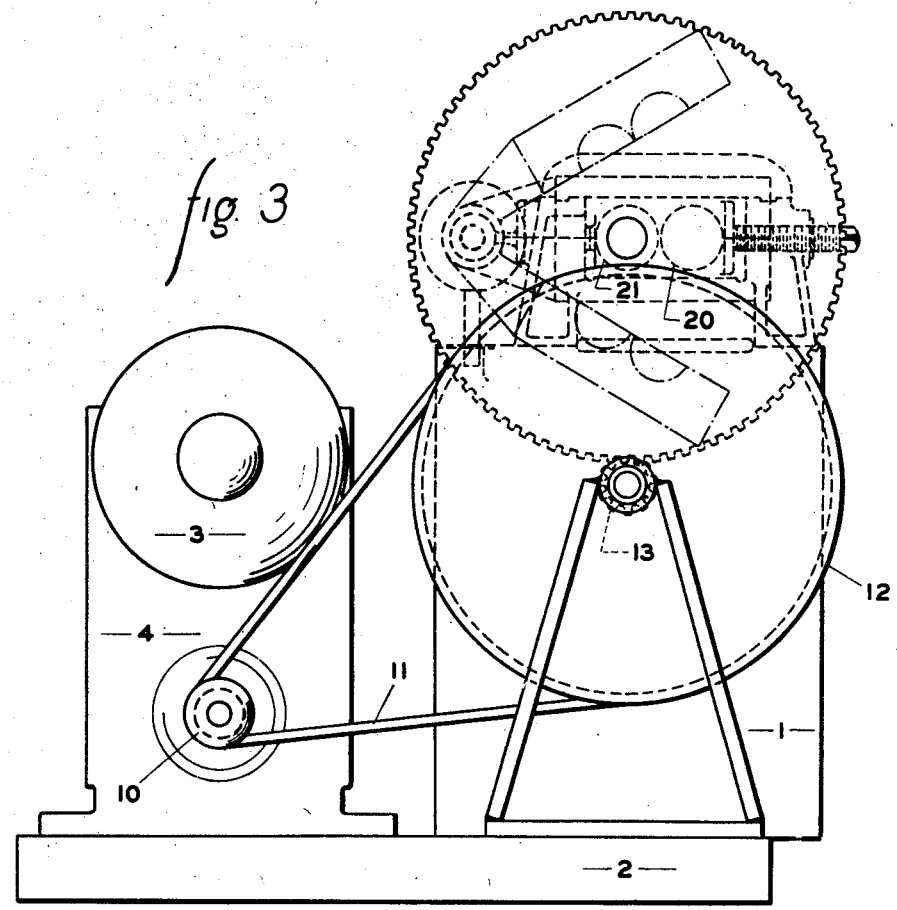
Figure 3 is an end assembly view of my machine.

Referring now to the drawings there is shown in Figures 1, 2 and 3 the overall assembly of our machine. Since many of these parts are conventional and can be supplied by any person acquainted with equipment of this general type, only sufficient of the assembly is here shown to illustrate its organization and detailed explanation is limited to the actual processing and extruding parts of the machine. (Except where by the context clearly indicated otherwise, the word "processing" wherever used in this specification and in the hereinafter appended claims shall be taken to mean, or pertain to, any one, any portion, or all of the steps more particularly designated as milling, mixing, colloiding, heating, cooling, or other similar operations with respect to the plastics material.)

There is first provided a body part 1 mounted upon a suitable base member 2. Said base member extends rearwardly of said body part to provide a mounting for a suitably energized motor 3 and a speed reduction gear box 4 associated therewith. Extending upwardly from the top of the body part 1, conveniently but not necessarily, integrally therewith are the roll and platen supporting extensions 5 and 6. Contained in one part of each of said supports are the bearings supporting the hereinafter described processing rolls. Contained in another part of said supports are the bearings supporting the platen hinge shaft 7 which, through suitable hinge members hereinafter described in detail, supports the upper housing, or platen, member 8 and the lower housing, or platen, member 9. These housings receive and surround the processing rolls.

A power take-off pulley 10 drives a plurality of V-belts 11 by which is driven a large wheel 12. Mounted on the same shaft with said large wheel for turning with it is a pinion 13. The shaft upon which said large wheel 12 and the pinion 13 are mounted may be supported in any convenient manner as by a bearing 15 held within the body member 1 and a bearing 16 mounted upon a suitable frame support 17.

The pinion 13 drives the large gear wheel 18 which is mounted on and drives the shaft 19. This shaft in our preferred embodiment is connected directly to one of the two milling rolls 20 and 21, here the roll 21, but it may be connected thereto through other gearing without changing the scope or principle of the invention. From the said roll 21 there extends at its other end a shaft 22 driving a gear 23 which in turn drives a gear 24 and a shaft 25. This latter shaft is connected directly or through other gearing to the roll 20. The gearing ratio may be freely selected to drive the rolls at any desired speeds with respect to each other. In our preferred embodiment this ratio is 21–27 but it may be varied as desired according to known milling practice.

The mechanism described thus far illustrates one particular way of supporting the roll platens, or housings, and supporting and driving the processing rolls within said platens. It should be understood, however, that many other designs for this purpose can easily be made as required for adaptation to specific uses and places of use, and that mere change in the manner of supporting and driving the operating parts hereinafter described will by itself in no way affect the operation and/or the principles of the invention.

The platen members

Turning now to the platen members, or roll housing in more detail, there is shown in Figure 4 a phantom top view of the platens with the holding bolts removed. Referring then to this figure as well as Figures 5 through 11 description will first be made of the upper platen 8.

This upper platen 8 comprises first a substantially rectangular body block 30 having therein a pair of adjacent, parallel, substantially semi-cylindrical platen recesses 31 and 32. Feeding openings 34 and 35 (Figure 4) are provided through said top member at each end thereof for the introduction to the rolls of material to be milled. These are operatively connected to any convenient form of material feeding means, such as a hopper and chute (not shown). As here shown, the said recesses will when placed together with corresponding recesses in the lower roll housing form a pair of cylindrical roll receiving processing chambers, but it should be understood that these chambers may be of other shapes, as conical, to meet certain circumstances without departure from the scope of the invention.

Figure 20:
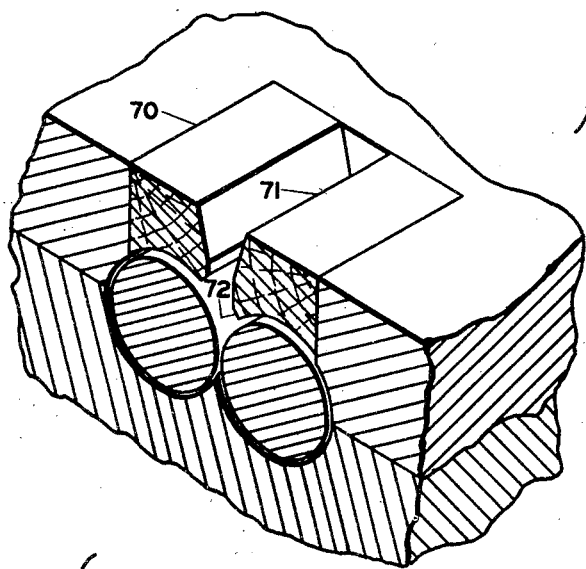
Figure 20 is a section showing the construction of the feed opening controlling blocks in assembled position with respect to the upper and lower housings and roll, said section being taken on line XX—XX indicated with respect to the upper housing in Figure 16.

Fitted, and suitably held, within each of said feeding openings is a pair of blocks controlling the exast size and shape of the actual feeding opening and permitting the operator by mere insertion of such blocks of selected dimensions and shape to change and adjust said size and shape of said feeding openings in order to accommodate the characteristics of the various kinds of plastic materials which the machine may be called upon to handle. The specific form shown in Figure 20 has been found highly advantageous for handling "Tenite II" in granular form and will be suitable for a wide variety of similar granular plastics, but it is conceivable that other precise forms of feeding openings will be found preferable for certain other kinds and/or forms of plastics materials. In this particular case the blocks, as utilized with rolls four inches in diameter and twenty inches long, provide a feed opening 1 inch wide and 4⅛ inches long, and said blocks preferably have a 45° chamber at their respective corners 72. It should be clearly understood, however, that these dimensions are illustrative only and in no way limiting.

The body part block 30 has extending from its rearward side a main hinge supporting bar 36 and a minor hinge supporting bar 37. The main hinge supporting bar 36 is affixed to hinge mechanism 38, hereinafter described in more detail, which is rotatably supported on the hinge supporting bar 7, and the minor hinge bar 37 is affixed as by welding to a ring 39 likewise supported with a suitable bearing on the hinge supporting bar 7. Said upper platen also has a plurality of openings 40 along its side for the reception of bolts holding the said upper platen in tight operative association with the hereinafter described lower platen.

The lower platen 9 (Figures 5, 7 and 8) is substantially similar to the upper platen 8. It comprises a rectangular body block 41 within which are provided a pair of substantially semicylindrical recesses 42 and 43. Said lower platen has discharge opening 44 (Figures 4 and 8) at a selected discharge point, here substantially in its center, for the discharge of milled and mixed material under pressure to whatever means, such as an extruding die, is provided for the reception thereof. Said lower platen 9 is provided with a main hinge supporting member 45 and a minor hinge supporting member 46, said member 45 being operatively connected with a main hinge 47. This hinge and the minor hinge 48 both encircle the hinge supporting shaft 7 (Figure 4) in the same manner as the other hinges as hereinafter described in detail. Said lower platen 9 also has openings 40a along its side similar to the openings 40 indicated for the upper platen 8 through which extend the bolts, above mentioned, engaging said two platens and holding them tightly together.

Both of said platens may be, and usually are, provided with a plurality of passageways 49 (Figures 6 and 9) through which may be passed warming or cooling fluids as required for providing a selected temperature at any given point or zone along the walls of the semi-cylindrical recesses. These passageways are frequently associated with independent systems of fluid conduction by which conditions may be quickly adjusted as needed from time to time to meet different temperature requirements from one platen zone to another. Other heating or heat controlling means, as electrical, may alternatively be provided.

Within the semi-cylindrical platen recesses (Figures 7 and 16) are a plurality of wide and shallow helical grooves 50 and 50a, hereinafter sometimes called "platen grooves," of which the grooves in the one platen cooperate with the grooves in the other platen, when the platens are together in operating, or closed, position, to provide a continuous helical flight from near each end of the platens toward the discharge point following various patterns as desired. The direction and arrangement of these helices is such that material following the grooves in the same circumferential direction will move from each end of the platens toward said discharge point. These grooves are of such depth that they intersect each other near the nip of the rolls as indicated by the numerals 33 and 67 in Figure 6. The lands are preferably cut off even with these points of intersection by which to form a continuous slot, or material exchange opening, providing a passageway between the roll receiving chambers when the platens are closed as appearing in Figure 6.

The helical platen grooves 50 may sometimes be placed in liner members as those shown at 51, 52, and suitably affixed in the housing as shown in Figure 6 if desired. This provides for ready replacement of the grooves as they become worn, or for the replacement of a given set of grooves by ones of different characteristics, more conveniently than by replacing the entire platen structure.

A further advantage of forming these platen grooves in liner members arises from the problem of making suitable adjustment of the processing rolls toward or away from each other to accommodate them to the handling of plastic materials of different kinds. Said rolls being suitably mounted for moving toward or away from each other in any convenient and conventional manner as indicated following, it is necessary similarly to adjust the inner surfaces of the platens adjacent said rolls. This is conveniently accomplished by providing a plurality of such liners for association with whichever roll is to be adjustable. This will usually be the roll most remote from the hinge structure, but it may be the other roll or in certain cases it may be both rolls. By making the internal diameter of the liner on a center eccentric to that of the external diameter, a liner may be made to fit a given position of the said roll and other liners may be provided appropriate to other adjusted positions of the said roll. One such liner is illustrated in Figure 15 in which is shown together in operative position the upper and lower parts 52 and 51, respectively. This figure also shows suitable means, such as the bosses 71, by which said liners are affixed in place with respect to the platens into which they are positioned. The liner part appears in position in the platens in Figures 6 and 16.

In the form shown in the drawings the platen grooves are in the walls of all four of the recesses 31, 32, 42 and 43 and follow respectively single helices from points near each end thereof toward the said discharge point. However, where a higher volume of delivery is desired and less mixing needed then that for which the particular machine here illustrated was designed, these grooves may comprise a plurality, such as two, of independent helices from at least near each end of the platens toward the discharge point, said helices in such case having a substantially greater pitch than those here illustrated. Although the passageway defined by a platen groove may follow, excepting only for the break therein caused by the cut-out parts indicated at 33 and 67, a single, continuous helix throughout its length, normally these helices will be designed so that the passageway will extend first around one roll, then cross over into the adjacent opening and extend around the other roll. If more milling is desired with less mixing and less delivery, then the gooves may be omitted entirely from one pair of roll surrounding walls, such as the walls surrounding the roll 21. These alternative helix patterns are not shown herein since they may be multiplied indefinitely and, excepting as otherwise set forth herein in detail, appear at this time to be primarily matters of design.

The processing rolls

Within the cylindrical chambers formed by the above-mentioned pairs of cooperating semi-cylindrical recesses in the said platens, are located the processing rolls 20 and 21. As here shown these are substantially cylindrical rolls to fit the cylindrical chambers formed by said cooperating platen recesses and ordinarily they will be of such shape. However, even if they are of other shapes, such as conical to fit other shapes, such as conical, of platen recesses, they may still be arranged according to the principles herein disclosed without departure from the objectives of the invention. Shaft extensions from each end of said rolls are mounted in suitable bearings in the upstanding roll supporting members 5 and 6.

The processing rolls are provided with at least partially smooth surfaces and are mounted so that the nip is within the slot defined between the edges 33 and 67, and their surfaces will be spaced a proper distance apart at the nip to provide the fineness of milling desired. They are of such size and shape with respect to the adjacent surfaces defining the platen recesses as to provide no more than an easy running clearance between their surfaces and the lands between the platen grooves 58 and 58a. Conventional means for adjusting the position of one roll relative to that of the other roll, as through appropriate adjustment of their supporting bearings, may be provided in any convenient manner. Preferably each end of at least one roll will be independently adjustable toward and away from the corresponding end of the other roll.

In the preferred embodiment of the machine as here illustrated, the carrying of material out from the area under the feeding openings, hereinafter sometimes called the "feeding zone," is assisted by a wide helical groove (Figure 11) provided at each end of each roll which groove is of progressively decreasing depth from the respective ends of each of said processing rolls toward said center leaving the helical land 74 thereon. Said roll grooves normally extend inward from the ends of each roll a distance sufficient to insure that the material being fed into the machine will be packed well into the space beyond the feeding zone between the surface of the rolls and the walls of the surrounding recesses, hereinafter sometimes called the "processing zone," and without likelihood of any back flow. If, however, such back flow should be desired for any purpose, such as the removal of moisture, it can be provided as needed by lessening the distance that the roll grooves extend into said processing zone. In the embodiment here particularly shown, these roll grooves extend across the feeding opening and beyond same toward the material discharge point a distance axially equal to about one half of the parallel, or axial, dimension of the feed opening, but it can be made more or less as needed to insure more or less positive introduction as desired into the processing zone of the machine.

The pitch of these roll grooves is preferably such that a single turn will approximately equal the axial lengths of the feed openings and this will be found to provide the desirable feeding characteristics for a large number of purposes. However, this pitch can be more or less if desired for other reasons without going outside the scope of our invention. These grooves may be arranged in single or multiple helices as desired.

The depth of these roll grooves at their deepest part in the particular embodiment here illustrated is approximately twice the depth of the platen grooves. However, this relationship will be greater or less as the bulk factor is greater or less between the material as it is fed into the machine and the material within the processing zone of the machine.

Figure 11:
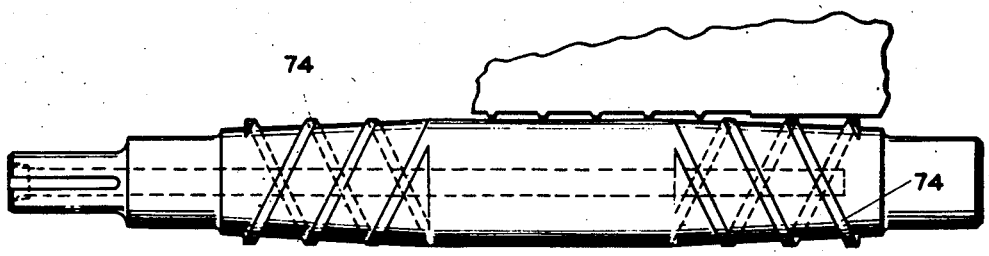
Figure 11 is a view of one of the rolls and a part of the surrounding housing.

Incidentally, it should be noted at this point that where the bulk of the plastic material is reduced with any material rapidity during the milling, mixing or other processing, such as in response to increasing pressure or progressing polymerization, it will be desirable proportionately to reduce the cross-sectional area of the platen grooves progressively from the feed opening to the discharge opening. This may be done either by progressively narrowing the grooves or by progressively shallowing them, or a combination of both narrowing and shallowing them, as illustrated in Figures 24 and 25. In this way the material will be kept moving axially of the rolls at a substantially constant rate and thereby make possible more exacting control over the heat and compression supplied thereto.

Where the processing rolls are so grooved, the grooving of the platens will commence a short distance from each respective end of the roll receiving platen recesses. As best shown in Figure 11 the grooves in the rolls should overlap the grooves in the platens from about one to about two turns.

Where a high degree of milling and/or mixing is required so that the rate of material handling will necessarily be low, there may be used entirely smooth rolls as illustrated in Figure 21. In this case the platen grooves will commence substantially at the ends of the roll receiving recesses so that said grooves will be opposite substantially the full extent of each of said rolls. Occasionally, one fully cylindrical and smooth roll as shown in Figure 21 will be used in conjunction with a roll having the feeding grooves above described, in which case the platen grooves will be modified to fit each as above described.

The discharge opening

Figure 7:
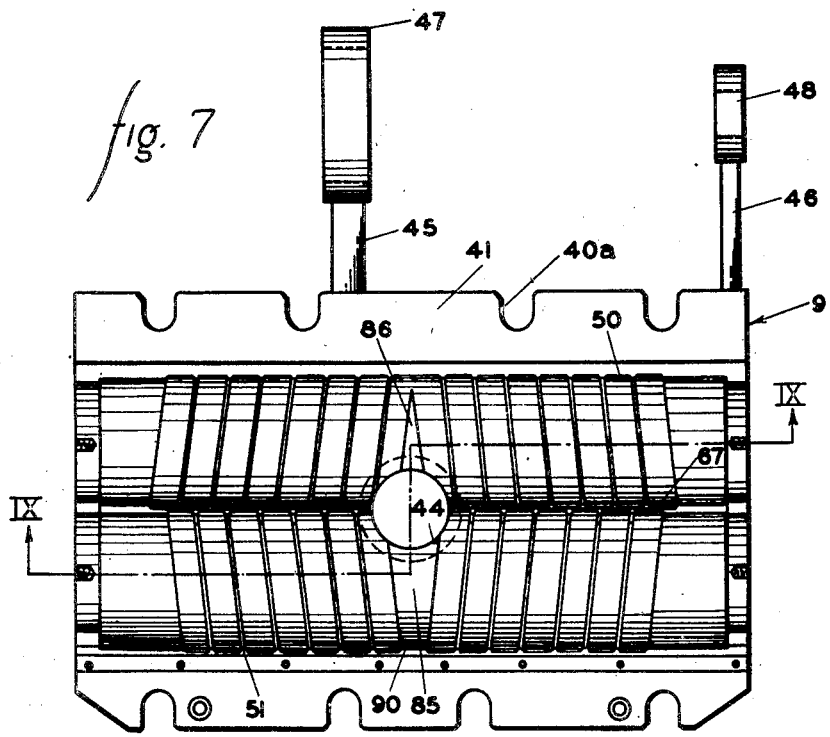
Figure 7 is a top plan view of the lower roll receiving housing.
Figure 9:
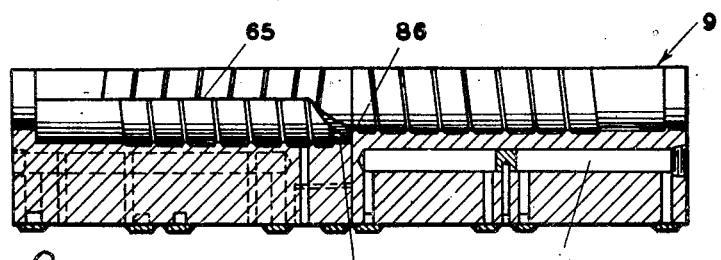
Figure 9 is a section taken on the line IX—IX of Figure 7.
Figure 10:
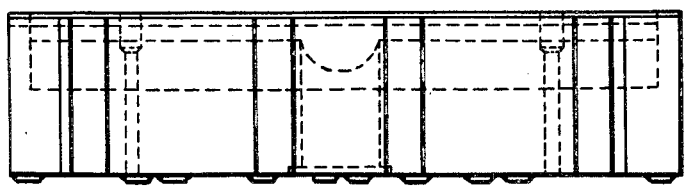
Figure 10 is a front view of the lower part of the roll receiving housing.

It will be observed that on the bottom platen illustrated in Figure 7 the grooves terminate adjacent the discharge opening 44 so that the areas 85 and 86 are not grooved but rather comprise relatively wide lands. In the upper platen (Figure 16) the area 87 likewise comprises a wide and continuous land and it will be understood that when the upper and lower platens are together in operative position the end 88 of said land 87 fits against the end 90 of the land 85. A groove, however, is present in the center of the portion of the platen surrounding the other roll and is indicated at 91.

Figure 17:
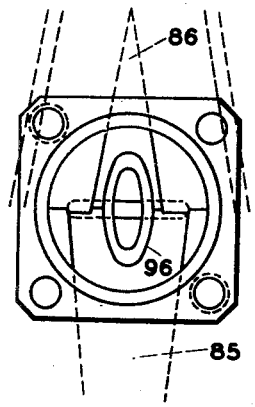
Figure 17 is a top view of a discharge die showing in broken lines the groove and land relationship therewith.
Figure 18:
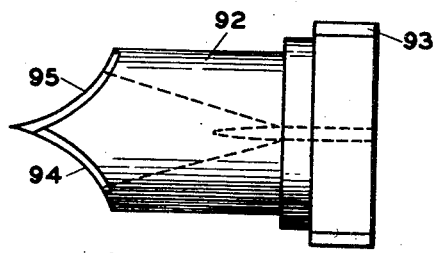
Figure 18 is a side view of the discharge die illustrated in Figure 17.
Figure 19:
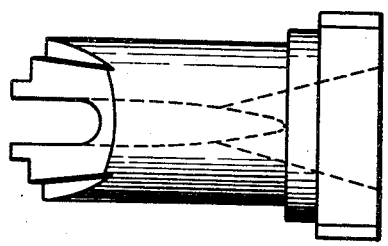
Figure 19 is a further side view of said discharge die.

Referring now to Figures 17, 18 and 19 there is shown one manner of inserting an extrusion die into the discharge opening 44. Said die comprises a substantially cylindrical body member 92 having a flange 93 by which said die is bolted to the bottom of the lower platen 9. The upper end of the body member is curved on each of its sides 94 and 95 to provide a continuation of the contour of the surfaces of the lower platen surrounding the discharge opening 44, including continuations of the lands thereon. In Figure 17 there appears in broken lines a showing of the contour of the lands in the region of the discharge opening and their manner of cooperation with said upper end of the body member 92. Comparison of this figure including these broken lines with Figure 7 in the region of the opening 44 will make this relationship clear.

A passageway 96 extends from the upper end of said die body part axially entirely therethrough. In the form here shown a ribbon discharge is contemplated but it will be understood that any discharge contour may be adopted.

While this insert as described is useful where it is desired to change the characteristics of the outlet opening from time to time, it may in other cases be integral with the bottom plate and a selected die merely placed on the lower side of said plate in suitable register with an outlet opening corresponding to what is here shown as the passageway 96. Other variations may be freely made in the characteristics of this outlet opening, and the die or other means associated therewith, without going beyond the scope of the invention.

Returning now to Figure 16 it will be seen that material will approach the discharge point of the mechanism through the groove 91 and through the grooves 97 and 98. From all three grooves material will be discharged into the nip of the rolls directly above said discharge opening. Said opening being entirely surrounded by the lands 85 and 86 (Figures 7 and 17) material from the rolls will be forced through said opening and little or none will be carried past it.

The platen hinge structure

Turning now to detailed consideration of the construction of the platen hinges shown generally at 38 and 47 in Figure 4, attention is directed to Figures 12 and 13. In Figure 12 there is shown the main hinge bars 36 and 45 of which the latter is shown connected as by welding to a ring 55. This ring surrounds another ring 56 (Figure 13) constituting a part of the hinge hub and this in turn surrounds and operatively engages the central member 57 extending at 58 sidewardly from the said hub and appropriately provided with teeth to constitute a segmental gear 59. Similar construction is provided for the main hinge 38 acting with the upper housing part by which it likewise is appropriately provided with teeth to constitute a segmental gear 60 on a similar extending part 61 of a corresponding hinge hub.

Surrounding the extending part of both of said hinge hubs is a yoke member 62 mounted for vertical sliding movement and provided internally with a pair of short racks 63 and 64 engaging the segmental gears 59 and 60, respectively. A vertically reciprocable slide member 65 depending from the yoke 62 is received into a guide opening 68 in the frame of the machine by which rotation of the yoke 62 is prevented. This is necessary in order to effect proper cooperation of the parts.

As the yoke 62 is moved vertically it will engage the teeth of the segmental gears 59 and 60 and cause the hub parts associated therewith to rotate in opposite directions. Thus there is imparted through the respective hinge hubs opposite rotative movement to the hinge rings, such as that at 55, by which the said platens may be moved apart into open position or moved together into closed position as desired. In the embodiment illustrated a downward movement of the yoke 62 will be associated with separation of the platens and an upward movement will be associated with their coming together. Since the weight of the lower platen 9 will tend to move said platens to open position and the weight of the upper platen 8 will tend to move said platens to closed position, the overall tendency will be substantially balanced and the opening and closing of the platens will be easy.

Operation

The particular machine above described operates as follows.

With the platens open as above described the operator puts into place the desired liners 51 and 52, appropriate to the particular roll adjustment desired, and adjusts the processing rolls 20 and 21 to the proper distance apart, depending upon the particular operation to be carried out. The platens are then closed and the bolts 66 (Figure 1) are positioned and tightened. Material to be milled, mixed and/or otherwise processed is then introduced through each of the inlet openings 34 and 35, where said material enters between the parts of the rolls directly opposite the portion of said openings exposed between the blocks 70 and 71 and between the blocks 70a and 71a. As the material passes between the rolls it drops onto the edge 67 (Figure 6) comprising the intersection of the bottoms of the meeting platen grooves and splits, part going to one side and part going to the other side. The feeding lands 74 push the material into the processing zone between the roll and grooved walls beyond the feeding openings. The material being so carried between the processing rolls builds sufficient pressure on the discharge side of the nip of the rolls that such material is forced through the grooves around the circumference of the rolls in both directions and is again fed between the rolls but at a point spaced longitudinally of said rolls from the first point of feeding. Since each time that the material goes between the rolls an increment of pressure is added to the entire mass, by the time that it reaches the discharge point of the rolls the material is being moved under a large amount of pressure and may be forced directly through an extrusion die with a high degree of efficiency. The magnitude of the total force will be a function of several factors, such as the closeness of the rolls to each other, the closeness of the roll surfaces to the bottoms of the grooves, the speed of rotation of the rolls and the number of flights made by a single groove from a feeding point to a discharge point on the rolls.

Referring to Figures 7 and 16, it will be observed that the grooves of the one platen recess are offset with respect to the grooves of the other platen recess. In this way material moving in a selected groove around the upper part of the roll in, for example, the recess 80 will pass between said rolls and strike the edge 67. Here it will divide into three parts, of which one part continues on around the same processing opening in the same groove, another part crosses to the recess surrounding the other processing opening and goes into the groove 80a next ahead of said selected groove and a third part crosses to the recess surrounding the said other processing opening and goes into the groove 80b partially behind the said selected groove. By thus advancing part of the material ahead one-half groove and retarding a part back one-half groove a thorough and complete mixing is secured. It will be evident that by placing the grooves in the surfaces surrounding the rolls so that the grooves surrounding one roll are advanced or retarded more or less with respect to the grooves surrounding the other roll various degrees of mixing may at will be selected with respect to the amount of milling required.

*Modification*

Figure 22 shows a modified form of feeding means wherein means are supplied surrounding the feeding opening for holding the plastic material at a desired temperature prior to its introduction between the processing rolls. Since most plastic materials will soften upon the application of heat and when softened the particles thereof become adherent to each other and to the surrounding metal surfaces, it will often be desirable to provide in the walls of the funnel 81 fluid conducting openings 82 connected to a suitable source for the circulation of cooling fluid. This funnel is mounted in the upper platen 8 within each of the feeding openings 34 and 35 and is preferably separated from immediate contact with the metal of said platen by suitable heat insulation 83. It will of course be evident that warm fluid may be circulated through the opening 82 if such circumstances are present as to make it desirable to preheat the plastic material entering into the device. The openings 49 indicate the fluid conducting conduits controlling the temperature of the platen as above described.

In certain instances, it may be desirable to modify the above disclosed apparatus to provide for only one way operation. This is illustrated in Figure 23 in which is shown the lower platen with one processing roll, 20a, in place. The relative position of the feeding opening in the upper platen with respect to the lower platen is shown in said figure by broken lines. This is substantially similar to the above disclosed and described mechanism when same is operated by feeding from only one end. Between the feeding opening 34a and the discharge opening 44a this modification is constructed and operates exactly like the one disclosed and described above. However, there is no feeding from the opposite end and the oppositely directed flights 50a function solely to direct back toward the discharge opening 44a any plastic material which might otherwise have gone beyond it, by which said flight serves to protect the adjacent roll bearings from entry of material thereinto.

While the discharge opening in the double ended form above described as a preferred embodiment has been shown as placed midway between the two feed openings, it will be evident that this position may be varied one way or another as desired where different kinds of materials are fed into the respective feed openings and where such materials are desired to be processed in different amounts and for different lengths of time. In view of the foregoing it will be seen that by appropriately varying the position of the discharge opening, by varying the depth and/or pitch of the platen grooves and by suitably controlling the heating zones, a great variety of conditions can be provided for the different processing of different plastics prior to their being joined together at the discharge opening.

A further variation appears in Figure 26 wherein there is shown a bottom platen 100, having a pair of semi-cylindrical recesses as in the other forms above described, and having a plurality of grooves 101 in said recesses similar in form but opposite in hand to those of the embodiments already described. A roll 102 is shown in place and a cooperating roll is shown parallel thereto in phantom. These rolls are similar to the form of roll illustrated in Figure 21 for the machines of the preceding embodiments excepting that they are provided with relatively long shaft extensions, as at 103 and 104, which are supported in bearings as at 105 and 106, said bearings being spaced a substantial distance from the ends of the platen 100 for reasons appearing hereinafter and supported on the frame of the machine in any convenient manner.

The clearances at 110 between the several shaft extensions and the housing are made as small as possible consistent with free operation of the parts, but the longitudinal extent of each thereof is relatively large to minimize the quantity of material escaping therethrough from within the processing recesses. Outlet openings are provided at 107 and 108, which may be fitted with any convenient extrusion dies, not shown, in the same manner as above described for the other embodiments shown. An upper platen, not shown, is also provided in the same manner as shown for the other embodiments, excepting that its grooves will also be of hand opposite to those of such other embodiments in order to conform to the grooves 101 of the lower platen 100. The feed inlet, similar to those already described, is placed in said upper platen at a point to fall intermediate the outlet openings. It will be equidistant between them, as shown in projection by broken lines at 109, where it is desired to have the same amount of processing from the feed opening to each discharge opening, or it may be placed unequally distant from each of them if differently processed product is desired from the respective discharge openings.

By this embodiment, twin extrusion dies may be operated from one feed point and by one machine, or other convenient arrangements involving a split flow made possible. Further, a slight leakage is constantly maintained outwardly through the clearances 110 by which lubrication from the bearings is positively prevented from entering the extruded material. In spite of the resulting loss of material, this is highly desirable in certain cases where it is especially important to maintain freedom from such contamination.

It will be further understood that while construction embodying only two rolls has been above shown and appears at present to be the most useful and convenient, any plurality of rolls may be run together with suitably extended platens. In such a machine embodying multiple rolls each pair of rolls may be operated substantially independently of any other pair, or, alternatively, the platen grooves may be so designed that there will be a wide diffusion of the material being processed throughout a multiplicity of rolls as the material travels from one particular feed opening to some particular discharge openings.

Such variations, however, appear to be variations in design only and do not, so far as is now known, embody any different principles from those above disclosed and described.

The foregoing has described a specific machine made according to the invention which will accomplish the objects and purposes above outlined. Particularly, in the described machine there is a complete, thorough and rapid mixing of such materials as may be fed into the machine for the purpose. In this machine the operations of milling, mixing, colloiding, heating, cooling and creation of pressure may all be effected in a single operation, and the machine is one in which the parts may be manipulated, adjusted and/or replaced easily and quickly. Elaborating on the latter point, the processing rolls may quickly and easily be reached for cleaning, replacement or exchange since the parts of the surrounding housing can easily be made to move a substantial distance away from the rolls, and further, such motion of the housing parts can be effected quickly and without unreasonable inconvenience.

A particular advantage of our herein disclosed machine is that the rolls are adequately supported by bearings at each of their ends, and there is no material under pressure adjacent said bearings.

It should be noted that although the foregoing description has been in terms of grooves made in the walls defining the processing openings, it could as well have been made in terms of ridges extending toward said rolls from said walls. In each case the structure and its function are the same.

The feed inlet is shown as at the top of the cooperating housings, and the outlet appears at the bottom. It is equally operable to place the feed openings at the bottom and the outlet opening at the top, all three openings at the bottom or all three at the top or other combinations of the positionings without altering the scope and operation of the invention.

Further, the feed openings may in certain cases be placed at a selected point over one or both of the rolls instead of over the nip of the rolls as shown. This will be in response to the feeding characteristics of certain materials and excepting as otherwise claimed will not change the scope of the invention.

It is evident that many other variations and changes from the specific form herein disclosed can be made without departure from the principles of the invention and the herein disclosed embodiment is intended as illustrative only and not as limiting. It should particularly be emphasized that such details as mentioning of dimensions, showing a given number of groove flights associated with the rolls, the angle of inclination shown for the helix described by said groove and other similar items of detail are by way of illustration only and may be widely varied within the principles of the invention. Accordingly, the hereinafter appended claims are to be construed broadly and are to be limited only as expressly required by their own terms.

We claim:

1. In a machine for processing and extruding a plastic material the combination comprising: a pair of cooperating platens; means defining within said platens a pair of closely adjacent, processing chambers having a common side wall, and a slot in said common side wall providing communication between said chambers; the wall of at least one such chamber having a groove recessed thereinto and positioned thereon advancing substantially helically in one circumferential direction from one of its ends toward a discharge point intermediate the ends thereof; a similar groove similarly arranged advancing in the same circumferential direction substantially helically from the other end of said processing chamber toward said point; a processing roll having a smooth surface through a portion of its length centrally disposed in each of said chambers and of size to have only a running clearance between its surface and the lands between said grooves; means controllably effecting rotation of said rolls independently of, and in timed relation to, each other; means introducing material to be processed between said rolls at points adjacent both ends of said rolls and an outlet receiving discharge of processed material at said discharge point.

2. In a machine for processing and extruding a plastic material, the combination comprising: means defining a pair of closely adjacent, side-by-side, substantially cylindrical communicating chambers having a feeding zone and a processing zone, the wall of at least one of said cylindrical chambers having a wide helical groove recessed thereinto and positioned thereon advancing in one circumferential direction from one of its ends toward a discharge point intermediate the ends thereof; a similar groove similarly arranged advancing the same circumferential direction from the other end of at least said one chamber toward the said discharge point; a rotatable roll centrally disposed in each of said cylindrical chambers and of diameter to have a running clearance between its surface and the radially innermost surface of the walls defining said chambers, said roll having a constant diameter in the processing zone and tapering in the feeding zone to a minimum diameter at at least one end of said roll by a helical roll groove therein of progressively increasing depth; means controllably effecting rotation of said rolls; material feeding means adjacent said roll groove whereby said roll groove will assist in feeding material into the processing zone of the machine.

3. In a processing and extruding mechanism for plastic materials having a pair of cooperating platens containing therein means defining a pair of communicating processing chambers and a partially smooth rotatable roll within each of said chambers having the adjacent surfaces thereof parallel with each other; the improvement in means permitting adjustment of said rolls with respect to each other comprising: liner means defining one of said chambers, said liner having an internal diameter concentric with a pre-selected position of the roll which it surrounds and said liner having an external diameter concentric with the chamber in said platen into which it is designed to fit, said centers of concentricity being selected independently of each other.

4. A combined mill and pressure creating device for extruding plastic, comprising: a pair of cooperating housings having adjacent faces, each thereof having a pair of adjacent substantially semi-cylindrical recesses, at least one being helically grooved, cooperating with each other to form a pair of parallel adjacent communicating chambers; an at least partially smooth roll rotatably mounted independently of said housings for operating in each of said chambers, and means controllably effecting rotation thereof; hinge means supporting said housings and including balance means whereby the opening away from and closing toward said rolls of both of said housings may be readily effected.

5. A combined milling, mixing and pressure creating device for use with a plastic material, comprising: a pair of cooperating housings having adjacent faces, one such face having therein a pair of adjacent recesses of which each cooperates with a corresponding and opposite recess in the said adjacent face of the other housing to form a pair of axially parallel, adjacent, communicating chambers; a partially smooth rotatable roll in each of said chambers; hinged means supporting said housings including a toothed member associated with a hinge operatively connected with each housing; a pair of substantially opposed racks engaging said toothed members for causing oppositely directioned rotation of each thereof upon simultaneous lineal movement of each of said racks; means for effecting simultaneous lineal movement of said racks; whereby upon the occurrence of such movement said toothed elements will rotate in opposite direction and cause said housing to move away from or to move toward each other according to the direction of such movement of said racks.

6. In a combined mixing, milling and pressure creating device for use with a plastic material including a pair of housings having a pair of cooperating platens containing therein a pair of communicating processing chambers, and a rotatable roll within each of said chambers, and feed means at each end of said chambers admitting the plastic materials into at least one of said chambers and means axially spaced from said feed means conducting material out from said chambers, the improvement therein comprising: a substantially helical groove in the wall of one of said chambers extending from a point spaced from but near one end of said chamber to a point spaced from but near the other end of said chamber leaving ungrooved portions of the walls of said chambers adjacent each of said feed means, and said roll having a helically grooved portion substantially adjacent the ungrooved portion of said chamber wall and having a smooth portion substantially adjacent the grooved portion of said chamber wall, the material being fed being received adjacent the ungrooved portion of the chamber wall and the grooved portion of said roll and delivered therefrom to the space between the grooved portion of said chamber wall and the ungrooved portion of said roll.

7. In a combined milling, mixing and pressure creating device for use with a plastic material including a pair of cooperating housings having adjacent faces, one such face having therein a pair of adjacent recesses of which each cooperates with the corresponding and opposite recess in the said adjacent face of the other housing to form a pair of axially parallel adjacent communicating chambers and a rotatable, at least partially smooth, roll in each of said chambers, the improvement comprising: hinged means supporting said housing including a toothed member associated with a hinge operatively connected with each housing: a pair of substantially opposed racks engaging said toothed members for causing oppositely directed rotation of each thereof upon simultaneous lineal movement of each of said racks, means for effecting simultaneous lineal movement of said racks; whereby upon the occurrence of such movement said toothed elements will rotate in opposite directions and cause said housings to move away from or to move toward each other according to the direction of such movement of said racks.

8. In a machine for milling, mixing and extruding a plastic material, the combination comprising: a pair of cooperating platens having within themselves a pair of closely adjacent processing chambers communicating with each other through a material exchange opening in a common side wall, an inlet into each of said processing chambers near each end thereof and an outlet from said processing chambers intermediate said inlets; a smooth wall section defining said processing chambers in the region of each of said inlets and extending towards said outlets a distance less than the corresponding extent of said inlets, and said processing chambers further defined by walls having a helical groove commencing at the termination of each of said smooth wall sections and extending toward said outlets and being of opposite hand with respect to each other; a pair of rolls within said processing chambers having a helical groove of decreasing depth extending from each end of each thereof toward the center thereof a distance greater than the corresponding extent of the respectively adjacent inlets, said rolls being defined by smooth surfaces between the respective termination points of said helical feeding grooves; means independently and controllably rotating said rolls in timed relationship to each other; whereby the grooved portions of said rolls in cooperation with the smooth portion of said processing-chamber-defining-walls will constitute a feeding zone for said plastic materials and the smooth portion of said rolls in cooperation with the grooved portion of said processing-chamber-defining-walls will constitute a processing zone for said material and said rolls will constitute feeding rolls as well as processing rolls.

9. In a plastic processing machine the combination comprising: a horizontally split housing having hingedly connected parts which parts are provided with facing recesses cooperatively defining a pair of processing chambers whose adjacent peripheral surfaces are substantially tangent to each other; means defining a long and narrow slot between said chambers providing communication from one to the other; a feeding opening through said housing into said chambers and a discharge opening through said housing from said chambers at a point axially spaced from said feeding opening; the walls of said chambers being smooth in the region thereof axially adjacent said feeding opening and being spirally grooved from a point near said feeding opening to said discharge opening, the grooves in the respective chambers being of opposite hand; a roll in each of said chambers approaching each other in milling proximity throughout their respective lengths through said slot, each roll being spirally grooved in a material advancing direction in the portion thereof axially adjacent the smooth walls of said chamber and being of smooth surface through the rest of its extent, means independently rotating said rolls in timed relationship to each other.

10. A machine as claimed in claim 1 wherein the grooves which meet each other in the wall of the chamber on the side of said slot opposite from the outlet are open into said slot, and the wall of the chamber immediately surrounding the outlet is ungrooved, whereby no V-ends are provided in said grooves wherein plastics material can accumulate.

11. A machine for processing plastic material comprising the combination of a pair of juxtaposed rotatably mounted smooth rolls, the proximate surfaces of which are parallel, a closely fitting cylinder enclosing each roll, a wall separating the cylinders but having a slot therethrough adjacent the nip of said rolls through which said rolls extend in milling proximity to each other, an internal substantially spiral groove in each cylinder which grooves are of opposite hand and of such depth that grooves in one cylinder intersect those in the other cylinder at the surfaces defining said slot, an inlet through the side of said cylinders at each end thereof and an outlet through the side of said cylinders intermediate said inlets, means independently rotating said rolls in timed relation to each other.

12. A machine as described in claim 11 wherein the spiral grooves within said cylinders commence at points respectively spaced from the ends thereof and the rolls have spiral grooves commencing at the ends thereof and extending towards each other a distance sufficient to overlap at least one flight of grooves in said cylinders but maintaining smooth the greater portion of the rolls adjacent the grooved part of the cylinders, said inlets being placed to feed raw material directly to the grooved part of said rolls.

13. A machine as described in claim 1 wherein the portions of the grooves which are in one of said platens are offset axially with respect to the portions of the grooves which are in the other of said platens whereby to effect recirculation of portions of the plastic material being processed and improve the mixing thereof.

14. In a pressure creating device for use with a fluent material including a pair of housings having a pair of cooperating platens containing therein a pair of communicating processing chambers, and a rotatable roll within each of said chambers, and feed means at one end of said chambers admitting the fluent material into at least one of said chambers and outlet means axially spaced from said feed means conducting material out from said chambers, the improvement therein comprising: a recessed path in the wall of one of said chambers arranged around the roll within said chamber, and at least in part with a positive lead, extending from a point spaced from but near the feeding end of said chamber to a point spaced from but near the outlet end of said chamber leaving an unrecessed portion of the walls of said chambers adjacent said feed means, and said roll having a substantially helically recessed portion adjacent the unrecessed portion of said chamber wall and having a smooth portion adjacent the recessed portion of said chamber wall, the material being fed being received adjacent the unrecessed portion of the chamber wall and the recessed portion of said roll and delivered therefrom to the space between the recessed portion of said chamber wall and the unrecessed portion of said roll.

15. In a plastic processing machine the combination comprising: A horizontally split housing having hingedly connected parts which parts are provided with facing recesses cooperatively defining a pair of processing chambers whose adjacent peripheral surfaces are substantially tangent to each other; means defining a material exchange opening between said chambers providing communication from one of the other; a feeding opening through said housing into said chambers and a discharge opening through said housing from said chambers at a point axially spaced from said feeding opening; the walls of said chambers being spirally grooved from a point near said feeding opening to said discharge opening, the grooves in the respective chambers being of opposite hand and those grooves in one of said recesses being offset axially with respect to the grooves in another of said recesses; a roll in each of said chambers approaching each other in milling proximity throughout their respective lengths through said material exchange opening, each roll being of smooth surface throughout at least its central portion, means independently rotating said rolls in timed relationship to each other.

16. In a pressure creating device for use with a fluent material including a pair of housings having a pair of cooperating platens containing therein a pair of communicating processing chambers, and a rotatable roll within each of said chambers, and feed means at one end of said chambers admitting the fluent material into at least one of said chambers and outlet means axially spaced from said feed means conducting said material out from said chambers, the improvement therein comprising: a groove in the wall of one of said chambers arranged around the roll within said chamber and at least in part with a positive lead extending from a point spaced from but near the feeding end of said chamber to a point spaced from but near the outlet end of said chamber leaving an ungrooved portion of the walls of said chambers adjacent said feed means, and the portions of said groove in one platen being offset axially with respect to the corresponding portions of the grooves in the other platen a distance other than a distance equal to one full flight of said grooves.

ALDEN W. HANSON.
ALLEN L. HESTON.
HANS E. BUECKEN.

(References on following page)

REFERENCES CITED

The following references are of record in the file of this patent:

UNITED STATES PATENTS

| Number | Name | Date |
|---|---|---|
| 72,393 | Hale | Dec. 17, 1867 |
| 682,390 | Schrader | Sept. 10, 1901 |
| 1,260,320 | Bulley | Mar. 26, 1918 |
| 1,904,884 | Royle | Apr. 18, 1933 |
| 1,990,555 | Loomis | Feb. 12, 1935 |
| 2,119,162 | Hartner | May 31, 1938 |
| 2,367,394 | Griffiths | Jan. 16, 1945 |

FOREIGN PATENTS

| Number | Country | Date |
|---|---|---|
| 119,681 | Australia | of 1943 |